United States Patent Office 2,865,945
Patented Dec. 23, 1958

2,865,945
PROCESS FOR THE MANUFACTURE OF TETRAETHYL PYROPHOSPHATE

Jonas Kamlet, New York, N. Y., assignor to National Distillers and Chemical Corporation, New York, N. Y., a corporation of Virginia No Drawing. Application June 21, 1956
Serial No. 592,728

11 Claims. (Cl. 260—461)

This invention relates to a novel process for the manufacture of tetraethyl pyrophosphate and, more particularly, to an improved process for the manufacture of tetraethyl pyrophosphate from cheap and readily available industrial raw materials, viz: ethyl chloride and tetra-alkali metal pyrophosphates.

Tetraethyl pyrophosphate is a valuable organic insecticide, effective in the control of mites, aphids, thrips, and a variety of other insects. It is usually prepared in admixture with other isomeric, homologous and related organophosphorus esters (such as hexaethyl tetraphosphate). When obtained in a pure state, it is a mobile, amber-colored liquid, B.P. 104°–110° C. at 0.08 mm. Hg, 144°–146° C. at 3 mm. Hg, density at 20° C. —1.1848, refractive index $nD_{20}$ —1.4222. In the presence of water, tetraethyl pyrophosphate hydrolyzes rapidly, and loses its insecticidal potency. This is desirable since it will decompose after killing destructive insects without the deposition of a lasting toxic residue on fruit, flowers or other crops sprayed with the insecticide.

The present invention is based on the discovery that tetraethyl pyrophosphate can be prepared by reaction of ethyl chloride with an alkali metal pyrophosphate as for example, tetrasodium pyrophosphate and tetrapotassium pyrophosphate with the reaction being in accordance with the following using tetrasodium pyrophosphate as an illustration.

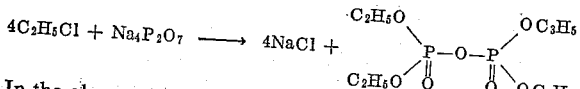

In the absence of catalysts, and in the presence or absence of solvents or suitable reaction media, the reaction proceeds slowly and with unsatisfactory yields. However, if the reaction is carried out in the presence of an iodide as a catalyst, and for example, in the presence of a catalytic amount of iodine, hydroiodic acid, ammonium iodide, the iodides of the alkali metals, alkaline-earth metals, and the like, this reaction may be effected at a highly practical rate with obtainment of good yields of the desired product.

Because of the sensitivity of the end product tetraethyl pyrophosphate in water, the phosphate salts used in the process of this invention must be anhydrous. The ethyl chloride may be employed in the reaction in theoretical proportions, i. e. at least four moles of ethyl chloride for every mole of tetra-alkali metal pyrophosphate. However, it is desirable to employ a 100% to 200% molar excess, i. e. eight to twelve moles of ethyl chloride for each mole of tetra-alkali metal pyrophosphate. Since the excess of ethyl chloride can readily be recovered after each cycle, and returned to the process, the use of the excess of ethyl chloride in no way represents an economic disability.

The reaction may be effected in the absence of solvents. However, it has been found that best yields are obtained by effecting the reaction in the presence of a certain solvent and reaction medium, as for example, such as an aliphatic ketone, aliphatic ester, and the like. Typical examples of aliphatic ketones suitable for use as solvents and reaction media are acetone, methyl ethyl ketone, diethyl ketone, methyl n-propyl ketone, methyl isobutyl ketone, methyl amyl ketone, diacetone alcohol, mesityl oxide, and the like. Typical examples of aliphatic esters suitable for use as solvents and reaction media are methyl acetate, ethyl acetate, ethyl formate, methyl formate, ethyl propionate, n-butyl acetate, isopropyl acetate, 2-ethylhexyl acetate, ethylene glycol diacetate, etc. It is believed that these ketones and esters have a moderate solvating action on the tetra-alkali metal pyrophosphates and thus increase the reactivity between the mutually immiscible or insoluble reagents, i. e. the ethyl chloride and the tetra-alkali metal pyrophosphates. In addition, these ketones and esters are otherwise unreactive to the reagents employed in this process.

The catalyst for this process is, as aforesaid, an iodide and, for purposes of this invention, includes iodine, hydroiodic acid, ammonium iodide, the alkali metal iodides and the alkali-earth metal iodides. Such catalysts may be used in any convenient amounts. Generally, the more of the catalyst employed, the more rapid is the rate of the reaction, and satisfactory reaction rates and good yields are generally obtained by use of from 0.01 to 0.10 mole of the iodide (on the basis of iodine-equivalency) for each mole of tetra-alkali metal pyrophosphate. It is believed that the iodine or iodide salt catalyst first reacts with the ethyl chloride to form the highly reactive ethyl iodide. The ethyl iodide than reacts with the tetra-alkali metal pyrophosphate to form the tetraethyl pyrophosphate, and regenerate the iodide ion. The latter then reacts with a further proportion of ethyl chloride to form more ethyl iodide. Ethyl iodide itself is a very expensive reagent and its use in the commercial preparation of tetraethyl pyrophosphate is commercially impractical. By the use of the small amounts of the catalysts of this invention, it is feasible to avoid the use of this expensive reagent and still to obtain satisfactory yields of the tetraethyl pyrophosphate.

The reaction of this invention may be effected at temperatures as low as about 40° C. However, at this temperature, the reaction is somewhat slow. The maximum temperature at which this reaction may be effected is limited by the fact that above 165° C., the tetraethyl pyrophosphate commences to decompose with liberal evolution of ethylene. Thus, the reaction temperature range is effectively limited to from about 40° C. to 165° C. Satisfactory yields are obtained within the temperature range of 80°–100° C. Since the ethyl chloride and most of the solvents and reaction media suitable for this process described above boil below this temperature range, it is desirable to effect the reaction in autoclaves or in closed reaction vessels suitable for pressure, and with good agitation or stirring.

The reaction time, or residence period within the autoclave or pressure vessel, may vary widely over a great range and is by no means critical, being largely dependent on the size of the batch. As a rule, a two to three hour reaction period at 80°–100° C. is suitable for the obtainment of satisfactory yields. By this procedure, the yields of tetraethyl pyrophosphate obtained are of the order of 50%–65% of theory per cycle. On the basis of recovered ethyl chloride and the yields based on the ethyl chloride actually consumed, the yields are of the order of 90–95% of theory. In the absence of the iodide catalysts of this invention, the yields per cycle are of the order of 15%–20% per cycle.

At the conclusion of the reaction, the reaction mixture is cooled and the mixture is then filtered. The insoluble material comprises the sodium chloride formed by the reaction and excess (unreacted) tetrasodium pyrophosphate. The filtrate is then distilled to recover the excess of ethyl chloride, which may be returned to the process. The iodine or iodide used as a catalyst will be present in this filtrate in the form of ethyl iodide (which is formed by the reaction of the ethyl chloride with the iodine or iodide salt). This is recovered and recycled with the ethyl chloride, and may be used as the catalyst in the next step. Thus, ethyl iodide itself may be used as a catalyst in this process, whether added as such in the first cycle of the process, or whether it is formed in the first cycle by reaction of the iodide with ethyl chloride and recovered in the subsequent cycles. The ethyl iodide boils at 72° C., and may be recovered with the solvent and reaction medium (i. e. the ketone or ester employed), and recycled to the process for use in the subsequent runs. If any iodide is lost in each cycle, it may be made up by the periodic addition of fresh catalyst, to bring the iodide equivalency up to from about 0.01 to 0.10 mole for each mole of anhydrous tetra-alkali metal pyrophosphate employed.

After filtering off the insoluble salts, distilling off (and recovering) the ethyl chloride, ethyl iodide and reaction medium (e. g., ketone or ester), the oily residue of crude tetraethyl pyrophosphate remaining behind may be employed as such, without further purification. If desired, it may be further purified by distillation under reduced pressure. Tetraethyl pyrophosphate may be distilled without decomposition at temperatures as high as 140°–142° C., under a vacuum of 2 mm. Hg.

Because of the insoluble nature of the tetra-alkali metal pyrophosphate, it is desirable that it be employed in as finely subdivided a state as possible, i. e. ground to a fineness of at least 60–100 mesh. As previously indicated, this reagent should be used in a substantially dry or anhydrous state to avoid premature hydrolysis of the tetraethyl pyrophosphate.

The following embodiment is given to define and to illustrate this invention but in no way to limit it to reagents, proportions or conditions described therein. Obvious improvements will occur to persons skilled in the art.

A mixture of 282 gms. of finely powdered anhydrous tetrasodium pyrophosphate (1.0 mole), 7.5 gms. of sodium iodide catalyst (0.05 mole), 646 gms. of ethyl chloride (10.0 moles) and 500 gms. of methyl ethyl ketone (as solvent and reaction medium) is charged into an autoclave, heated to 80–100° C. for two hours, with good agitation. At the conclusion of this period, the contents of the autoclave are cooled. Excess ethyl chloride is vented (and may be recovered and recycled). The reaction mixture is filtered from insoluble sodium chloride and tetrasodium pyrophosphate and the filtrate is distilled to a pot temperature of 90° C. to provide a distillate containing the methyl ethyl ketone and the ethyl iodide formed during the reaction. This distillate may be returned to the process for use in the subsequent runs as solvent and catalyst (the ethyl iodide). The oily residue in the still is then fractionated under reduced pressure. The tetraethyl pyrophosphate distills over at 140°–145° C. at 2–3 mm. Hg pressure, as a pure compound.

While there is above disclosed but a limited number of embodiments of this invention herein presented, it is possible to produce still other embodiments without departing from the inventive concept herein disclosed, and it is desired therefore that only such limitations be imposed on the appended claims as are stated therein.

What is claimed is:

1. A process for the manufacture of tetraethyl pyrophosphate which comprises reacting ethyl chloride with a member from the group consisting of tetrasodium pyrophosphate and tetrapotassium pyrophosphate at a temperature of about 40° C. to about 165° C. in the presence of a catalytic amount of an iodide.

2. A process, as defined in claim 1, wherein at least four moles of ethyl chloride are employed for every mole of tetra-alkali metal pyrophosphate.

3. A process, as defined in claim 1, wherein eight to twelve moles of ethyl chloride are employed for every mole of tetra-alkali metal pyrophosphate.

4. A process, as defined in claim 1, wherein the catalyst employed consists essentially of from 0.01 to 0.10 mole-equivalent of iodine per every 1.00 mole of tetra-alkali metal pyrophosphate employed.

5. A process, as defined in claim 1, in which the reaction is carried out in the presence of methyl ethyl ketone.

6. A process, as defined in claim 1, carried out at a temperature of about 80° C. to about 100° C.

7. A process, as defined in claim 1, wherein an inorganic iodide is employed as a catalyst, is converted in the reaction to ethyl iodide, and is recovered as such.

8. A process, as defined in claim 1, wherein the catalyst is sodium iodide.

9. A process, as defined in claim 1, wherein the catalyst is ethyl iodide.

10. A process, as defined in claim 1, wherein the reaction is carried out in presence of a lower aliphatic ketone.

11. A process, as defined in claim 1, wherein the reaction is carried out in presence of a lower aliphatic ester.

References Cited in the file of this patent

Kosolapoff: "Organo-Phosphorus Compounds," p. 337, John Wiley & Sons, New York, N. Y. (1950), citing:
Cavalier: Compt. rend. 142, 885 (1906).
Clermont: Ann. 91, 375 (1854).
Hall et al.: Ind. Eng. Chem. 40, 694 (1948).
Rosenheim et al.: Ber. 41, 2708 (1908).